United States Patent [19]

Long et al.

[11] Patent Number: 4,561,425
[45] Date of Patent: Dec. 31, 1985

[54] SOLAR COOKER

[76] Inventors: John B. Long, P.O. Box 404, Agoura, Calif. 91301; Robert R. Ware, 2600 The Alameda, Santa Clara, Calif. 95050

[21] Appl. No.: 574,732

[22] Filed: Jan. 30, 1984

[51] Int. Cl.⁴ ............................................. F24J 3/02
[52] U.S. Cl. .................................... 126/451; 126/438
[58] Field of Search ............... 126/451, 438, 439, 424, 126/425, 30; 350/292, 299; 248/181

[56] References Cited

U.S. PATENT DOCUMENTS

| | | | |
|---|---|---|---|
| 2,770,229 | 11/1956 | Tarcici | 126/451 |
| 2,791,214 | 5/1957 | Poliansky | 126/424 |
| 2,909,171 | 10/1959 | Lof | 126/451 |
| 3,797,476 | 3/1974 | Tarcici | 126/451 |
| 3,861,379 | 1/1975 | Anderson, Jr. | 126/438 |
| 4,010,614 | 3/1977 | Arthur | 126/439 |
| 4,034,737 | 7/1977 | Kume | 126/438 |
| 4,112,917 | 9/1978 | Lang | 126/451 |
| 4,262,660 | 4/1981 | Ilich | 126/451 |
| 4,281,644 | 8/1981 | Chiles | 126/451 |
| 4,292,957 | 10/1981 | Golder | 126/451 |
| 4,347,834 | 9/1982 | York | 126/424 |
| 4,350,412 | 9/1982 | Steenblik et al. | 350/292 |

FOREIGN PATENT DOCUMENTS

| | | | |
|---|---|---|---|
| 2907128 | 8/1979 | Fed. Rep. of Germany | 126/438 |
| 237423 | 8/1945 | Switzerland | 248/181 |
| 19732 | of 1908 | United Kingdom | 350/613 |
| 3898 | of 1912 | United Kingdom | 126/30 |

*Primary Examiner*—James C. Yeung
*Attorney, Agent, or Firm*—Manfred M. Warren; Robert B. Chickering; Glen R. Grunewald

[57] ABSTRACT

A solar cooking device made of a flat array of concentric mirrors tilted to focus at a small area, the array being movable mounted on a stand to be movable around a ball joint and with a carrier for a cooking vessel held by a double crank to be at the focal area of the mirrors.

3 Claims, 4 Drawing Figures

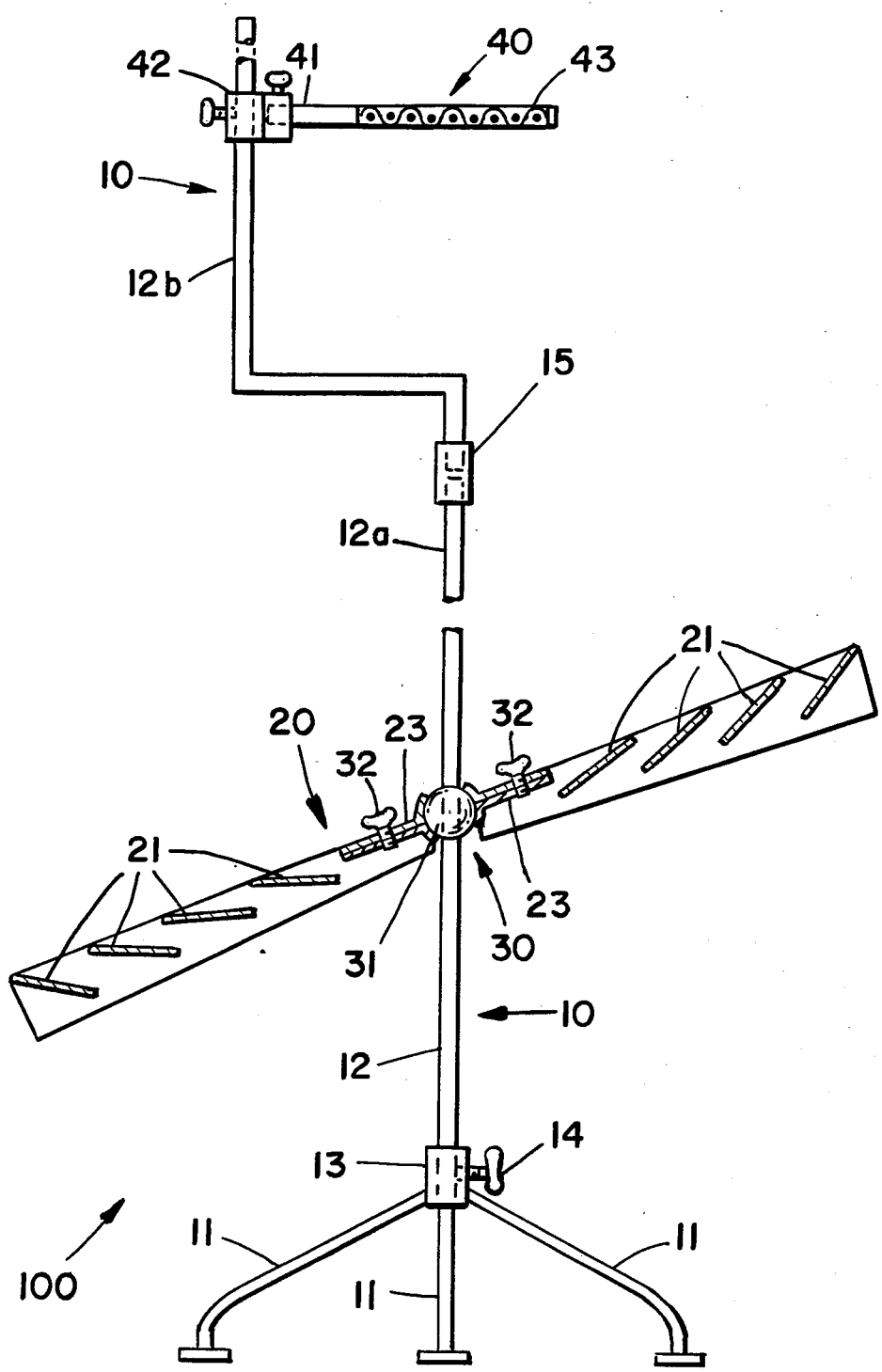
FIG_1

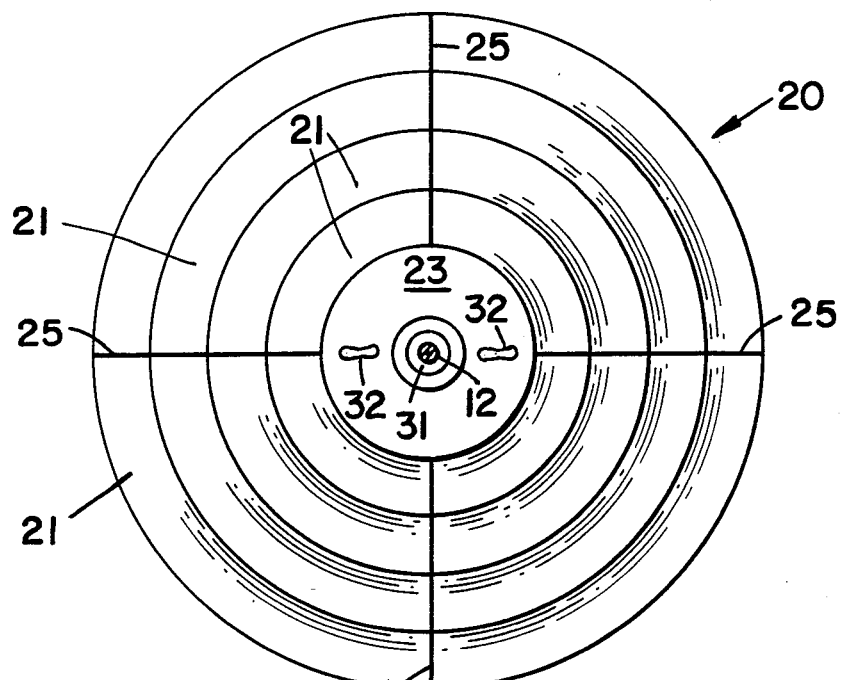
FIG_2
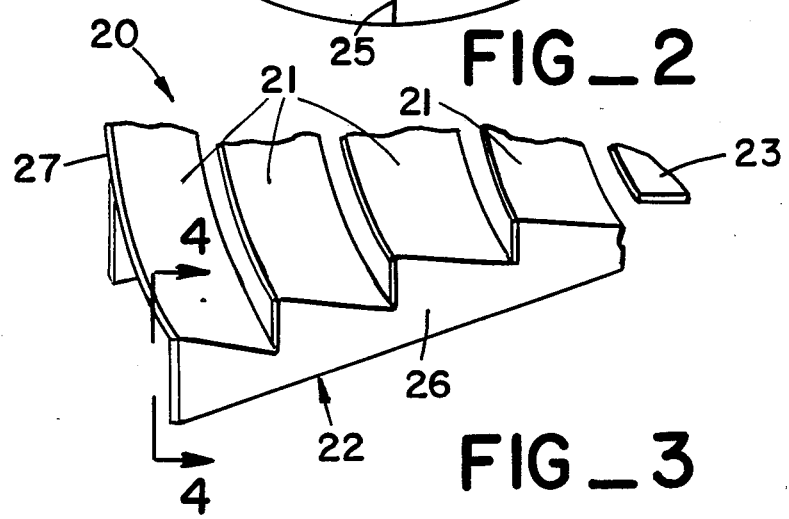
FIG_3
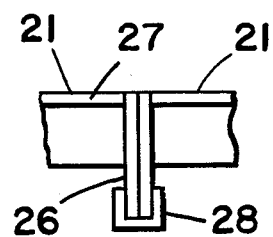
FIG_4

SOLAR COOKER

FIELD OF THE INVENTION

This invention relates to a cooking apparatus, and more particularly to a portable cooking apparatus adapted to converge the rays of the sun onto a cooking vessel.

BACKGROUND OF THE INVENTION

In certain parts of the world there is a critical shortage of wood or other fuel for everyday cooking purposes. In many of these places, for example The Philippines, there is an abundance of dependable sunshine that could be used for cooking purposes. Although various forms of solar cookers, heaters and collectors are currently known in the art, as exemplified by U.S. Pat. Nos. 2,770,229, 3,797,476, 4,112,917, 4,262,660, 4,281,644 and 4,292,957, many of these devices employ parabolic reflectors to concentrate the rays of the sun over a small area. Because such reflectors are expensive to manufacture and difficult to transport, they are of little use in remote locations and in countries where the standard of living is low. Consequently, there is a need for a simple, portable and inexpensive solar cooker which can be easily and quickly set up and used for everyday cooking.

Accordingly, an object of this invention is to provide a portable solar cooking device that is simple and inexpensive to manufacture, quickly set up and easy to transport for use in remote locations.

Another object of this invention is to provide a solar cooker having a construction that permits easy dissembling and compact storage and transport of the component parts.

A further object of this invention is to provide a solar cooker which is adjustable to allow easy orientation of the reflecting surface with respect to the sun while maintaining a cooking vessel at the area where the reflector concentrates solar radiation.

Another object of this invention is to provide a solar cooker that will be long lasting and trouble free in operation.

Other features, objects and advantages of the present invention will be apparent from the detailed description thereof, when read in conjunction with the accompanying drawings.

SUMMARY OF THE INVENTION

The solar cooker of the present invention comprises a reflector that is constructed from a plurality of reflective concentric rings arranged in a planar configuration. The term *planar configuration*, as used herein, is defined as a configuration in which flat rings are arranged with some part of each ring lying in a plane that includes some part of each other ring although each ring has a different tilt. This configuration is to be distinguished from a parabolic configuration. The tilt of the flat concentric rings of the cooker permits sunlight to be focused at an area, about 5 inches in diameter, obviating the need for the more expensive and difficult to manufacture parabolic reflector, and is more conducive to heating a cooking vessel.

The reflector of the present invention preferably is constructed from a plurality of pie-shaped segments, which attach together in a circular arrangement and which enable the device to be transported in its segments.

The assembled reflector is mounted on a support that includes a double crank structure. The structure is mounted on a universal means, typically a ball joint which permits easy adjustment of the reflector with respect to the position of the sun. The device also comprises a cooking surface mounted to the support structure and which can be moved to different horizontal positions by means of the double crank structure of the support. By adjusting the position of the cooking surfaces as well as the position of the reflector the device of this invention can be adjusted to maintain the cooking vessel at the spot where the sun's rays converge. Because the device can be dissembled, it is easily transportable.

BRIEF DESCRIPTION OF THE DRAWINGS

FIG. 1 is an elevational view of the device embodying this invention assembled for use.

FIG. 2 is a plan view of the reflector of the device of FIG. 1.

FIG. 3 is a partial perspective view of one segment of the reflector.

FIG. 4 is a partial right-side view of FIG. 2.

DETAILED DESCRIPTION OF THE PREFERRED EMBODIMENT

Referring now in detail to the drawings, the numeral 100 generally designates the solar cooker of the present invention. Solar cooker 100 includes a support, generally designated 10, having legs 11, and support post 12, removably mounted at one end to legs 11 by means of clamp 13 and secured by wing nut 14. Support post 12 is comprised of two sections, straight section 12a and crank section 12b connected to each other by means of collar 15, thereby permitting rotation of section 12b in relation to section 12a.

A reflector, generally designated 20, is attached to section 12a of support post 12 by universal means 30, which includes ball joint 31 and wing nuts 32, which will be discussed in detail below.

Reflector 20 comprises reflective, concentric rings 21, lying in a planar configuration with each ring tilted to reflect radiation falling normal to the plane of the rings to converge on a small area. Concentric rings 21 are carried by ring support 22 (see FIG. 3) which extends radially from a central disc 23. Reflector 20 is assembled from four pie-shaped sections, as illustrated in FIGS. 2, 3 and 4. The pie-shaped sections are separable from each other along lines 25.

The ring supports 22 are best seen in FIG. 3. Each ring support has a saw-tooth rib section 26 and a group of flat, tilted, ring-shaped surfaces 27 on which the reflective sheet mirror sections are mounted. Each mirror is tilted at a different angle with the outermost mirrors tilted most steeply.

The ring segments may be held together by any suitable means. One such means is illustrated in FIG. 4 in which one or more clips 28 embrace adjacent rib sections 26 from beneath so as to not interfere with the reflective surfaces. The reflective rings in this array collectively constitute a focusing mirror that is equivalent to an expensive parabolic mirror even though each ring mirror 21 may have a flat, tilted surface. In a preferred embodiment of the invention, each ring element 21 is a truncated cone that can be made of shiny shell metal by known forming processes. Flat mirrors are preferred because they can be supported on flat surfaces 27 which are inexpensive to manufacture. Central disc 23 is removably attached to ball joint 31 by means of wing nuts 32, thereby permitting reflector 20 to be disassembled for storage or transportation.

The device of this invention further comprises a means to hold a carrier generally designated 40 for a cooking vessel above relector 20 a distance approximately the focal length of the reflector. The carrier means 40 is rotatably attached to support post section 12b at one end of L-shaped carrier support 41, by means of collar 42. Carrier support 41 forms the second crank arrangement of the double crank support and it permits grid 43 to be supported at any position in a 360 degree rotation around support 12b. Collar 42 also permits carrier 40 to be raised or lowered to maintain grid 43 at the focal area of reflector 20. Grid 43, formed to hold a cooking vessel is attached permanently to carrier support 41.

The device permits the rotation of grid 43 about a vertical axis by means of collar 42 and collar 15. This rotation in conjunction with the ability to position reflector 20 about ball joint 30 permits the user of this device to maintain the focal area of the reflector on the bottom of a cooking vessel positioned on carrier 40 as the sun moves across the sky. It has been found that a small adjustment of the position of the reflector 20 or the grid 43 about each fifteen minutes will keep the device adjusted for cooking.

What is claimed is:
1. A solar cooking device comprising:
   a converging reflector constructed from a plurality of reflective, concentric rings lying in a planar configuration with each ring tilted to reflect radiation falling normal to the plane of said rings to converge at a focal area,
   a support for said reflector,
   universal means attaching said reflector to said support, and
   means including a double crank to hold a carrier for a cooking vessel, said means connected to said support above said reflector a distance approximately the focal length of said reflector.
2. The device of claim 1 wherein said concentric rings are fructo-conical.
3. The device of claim 1 wherein said reflector is formed of a plurality of detachable segments.

* * * * *